United States Patent
Kanitz

(10) Patent No.: US 11,740,540 B2
(45) Date of Patent: Aug. 29, 2023

(54) MOUNTING ASSEMBLY FOR A CABIN CAMERA

(71) Applicant: UATC, LLC, San Francisco, CA (US)

(72) Inventor: Daniel Adam Kanitz, Pittsburgh, PA (US)

(73) Assignee: UATC, LLC, Mountain View, CA (US)

(*) Notice: Subject to any disclaimer, the term of this patent is extended or adjusted under 35 U.S.C. 154(b) by 346 days.

(21) Appl. No.: 17/094,843

(22) Filed: Nov. 11, 2020

(65) Prior Publication Data
US 2022/0128889 A1    Apr. 28, 2022

Related U.S. Application Data

(60) Provisional application No. 63/104,112, filed on Oct. 22, 2020.

(51) Int. Cl.
*G03B 17/56* (2021.01)
*G02B 7/02* (2021.01)
*G05D 1/00* (2006.01)
*G01C 21/20* (2006.01)

(52) U.S. Cl.
CPC .......... *G03B 17/561* (2013.01); *G02B 7/022* (2013.01); *G01C 21/20* (2013.01); *G05D 1/0088* (2013.01)

(58) Field of Classification Search
CPC ...... G03B 17/561; G02B 7/022; G01C 21/20; G05D 1/0088
See application file for complete search history.

(56) References Cited

U.S. PATENT DOCUMENTS

| | | | |
|---|---|---|---|
| 10,955,855 B1* | 3/2021 | Tran | G05D 1/0246 |
| 2019/0244042 A1* | 8/2019 | Yang | G06V 20/59 |
| 2020/0231109 A1* | 7/2020 | Baitaxe | G06V 20/59 |

OTHER PUBLICATIONS

"Custom Metal Mounting Bracket for Adhesive Dashcam Lenses." The Dashcam Store, https://www.thedashcamstore.com/custom-metal-mounting-bracket-for-adhesive-dashcam-lenses/. (Year: 2018).*
TheDashcamStore. "Custom Alternative Mounting Brackets for Secondary Dashcam Lenses | Made in the USA." YouTube, YouTube, Sep. 21, 2018, https://www.youtube.com/watch?v=z3gOKJ-czho. (Year: 2018).*
TheDashcamStore. "Thinkware Q800 Pro 2K Dual Lens Dashcam | Unboxing." YouTube, YouTube, Jul. 9, 2019, https://www.youtube.com/watch?v=XbKHnb6Nyeg. (Year: 2019).*
"Thinkware Q800 Pro 2K Dual Lens Dashcam for Front + Rear Recording." The Dashcam Store, https://www.thedashcamstore.com/thinkware-q800-pro-2k-dual-lens-dashcam-for-front-rear-recording/. (Year: 2019).*

* cited by examiner

*Primary Examiner* — Clayton E. LaBalle
*Assistant Examiner* — Diana Hancock
(74) *Attorney, Agent, or Firm* — Dority & Manning, P.A.

(57) ABSTRACT

A mounting assembly for a cabin camera is provided. The mounting assembly includes a camera housing for the camera. The mounting assembly further includes a headliner mount removably coupled to the camera housing. The headliner mount includes a base and one or more retention members hingably coupled to the base. The one or more retention members are movable relative to the base to selectively secure the headliner mount to a headliner of a vehicle.

20 Claims, 12 Drawing Sheets

MOUNTING ASSEMBLY FOR A CABIN CAMERA

RELATED APPLICATION

The present application is based on and claims benefit of U.S. Provisional Patent Application No. 63/104,112 having a filing date of Oct. 22, 2020, which is incorporated by reference herein.

FIELD

The present disclosure relates generally to mounting assemblies for cameras and, more particularly, a mounting assembly for a cabin camera used in vehicles.

BACKGROUND

An autonomous vehicle can be capable of sensing its environment and navigating with little to no human input. In particular, an autonomous vehicle can observe its surrounding environment using a variety of sensors and can attempt to comprehend the environment by performing various processing techniques on data collected by the sensors. Given such knowledge, an autonomous vehicle can navigate through the environment.

SUMMARY

Aspects and advantages of embodiments of the present disclosure will be set forth in part in the following description, or may be learned from the description, or may be learned through practice of the embodiments.

In one aspect, a mounting assembly for a camera is provided. The mounting assembly includes a camera housing for the camera. The mounting assembly further includes a headliner mount. The headliner mount is removably couplable to the camera housing. The headliner mount includes a base defining an opening to accommodate the camera housing. The headliner mount further includes one or more retention members hingably coupled to the base. The one or more retention members are movable between a deployed position and a stowed position to selectively secure the headliner mount to a headliner of a vehicle.

In another aspect, an autonomous vehicle is provided. The autonomous vehicle includes a vehicle body defining an interior. The autonomous vehicle further includes a camera positioned within the interior of the vehicle body. The autonomous vehicle includes a mounting assembly. The mounting assembly includes a camera housing for the camera. The mounting assembly further includes a headliner mount. The headliner mount is removably couplable to the camera housing. The headliner mount includes a base defining an opening to accommodate the camera housing. The headliner mount further includes one or more retention members hingably coupled to the base. The one or more retention members are movable between a deployed position and a stowed position to selectively secure the headliner mount to a headliner of a vehicle.

In yet another aspect, a camera assembly for an autonomous vehicle is provided. The camera assembly includes a camera having one or more lenses. The camera assembly includes a mounting assembly for the camera. The mounting assembly includes a camera housing for the camera. The mounting assembly further includes a headliner mount. The headliner mount is removably couplable to the camera housing. The headliner mount includes a base defining an opening to accommodate the camera housing. The headliner mount further includes one or more retention members hingably coupled to the base. The one or more retention members are movable between a deployed position and a stowed position to selectively secure the headliner mount to a headliner of a vehicle.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
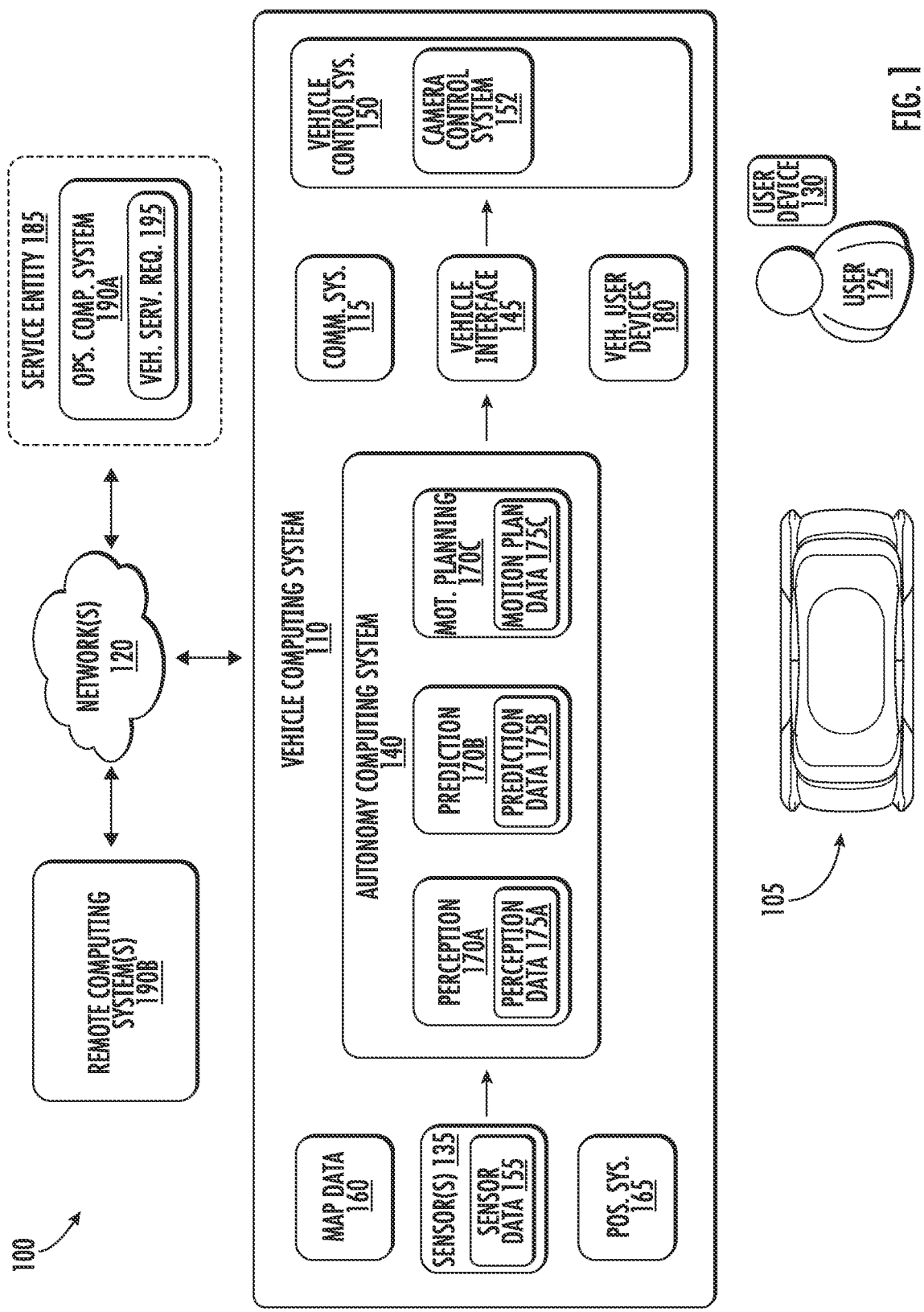
FIG. 1 depicts a block diagram of an example system for controlling an autonomous vehicle according to example embodiments of the present disclosure.

Example aspects of the present disclosure are directed to a mounting assembly for a cabin camera positioned within an interior of a vehicle such as, for example, an autonomous vehicle. The mounting assembly can include a headliner mount having one or more retention members movable between a stowed position and a deployed position to selectively secure the headliner mount to the headliner. Furthermore, the one or more retention members can accommodate variations in thickness of the headliner based on a make and/or model of the vehicle. In this manner, the mounting assembly can allow the cabin camera to be mounted to the headliner of different vehicles.

An autonomous vehicle can perform vehicle services for one or more service entities. A service entity can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of vehicle service(s) to one or more users. As an example, a service entity can offer vehicle service(s) to users via a software application (e.g., on a user computing device), via a website, and/or via other types of interfaces that allow a user to request a vehicle service. The vehicle services can include user transportation services (e.g., by which the vehicle transports user(s) from one location to another), delivery services (e.g., by which a vehicle delivers item(s) to a requested destination location), courier services (e.g., by which a vehicle retrieves item(s) from a requested origin location and delivers the item to a requested destination location), and/or other types of services.

An operations computing system of the service entity can help to coordinate the performance of vehicle services by autonomous vehicles. For instance, the operations computing system can include a service platform. The service platform can include a plurality of backend services and front-end interfaces, which are accessible via one or more APIs. For example, an autonomous vehicle and/or another computing system that is remote from the autonomous vehicle can communicate/access the service platform (and its backend services) by calling the one or more APIs. Such components can facilitate secure, bidirectional communications between autonomous vehicles and/or the service entity's operations system (e.g., including a data center, etc.).

The service platform can allow an autonomous vehicle to obtain data from and/or communicate data to the operations computing system. By way of example, a user can provide (e.g., via a user device) a request for a vehicle service to the operations computing system associated with the service entity. The request can indicate the type of vehicle service that the user desires (e.g., a user transportation service, a delivery service, etc.), one or more locations (e.g., an origin, destination, etc.), timing constraints (e.g., pick-up time, drop-off time, deadlines, etc.), a number of user(s) and/or items to be transported in the vehicle, other service parameters (e.g., a need for handicap access, handle with care instructions, etc.), and/or other information. The operations computing system of the service entity can process the request and identify one or more autonomous vehicles that may be able to perform the requested vehicle services for the user. For instance, the operations computing system can identify which autonomous vehicle(s) are online with the service entity (e.g., available for a vehicle service assignment, addressing a vehicle service assignment, etc.). An autonomous vehicle can go online with a service entity by, for example, connecting with the service entity's operations computing system (e.g., the service platform) so that the vehicle computing system can communicate with the operations computing system via a network. Once online, the operations computing system can communicate a vehicle service assignment indicative of the requested vehicle services and/or other data to the autonomous vehicle.

An autonomous vehicle (e.g., ground-based vehicle, aerial vehicle, light electric vehicle, etc.) can include various systems and devices configured to control the operation of the vehicle. For example, an autonomous vehicle can include an onboard vehicle computing system (e.g., located on or within the autonomous vehicle) that is configured to operate the autonomous vehicle. The vehicle computing system can obtain sensor data from sensor(s) onboard the vehicle (e.g., cameras, LIDAR, RADAR, etc.), attempt to comprehend the vehicle's surrounding environment by performing various processing techniques on the sensor data, and generate an appropriate motion plan through the vehicle's surrounding environment. Moreover, an autonomous vehicle can include a communications system that can allow the vehicle to communicate with a computing system that is remote from the vehicle such as, for example, that of a service entity.

The autonomous vehicle's sensor(s) can be configured to acquire sensor data. The sensor(s) can be external sensors configured to acquire external sensor data. This can include sensor data associated with the surrounding environment of the vehicle. The surrounding environment of the vehicle can include/be represented in the field of view of the sensor(s). For instance, the sensor(s) can acquire image and/or other data of the environment outside of the vehicle and within a range and/or field of view of one or more of the sensor(s). The sensor(s) can include one or more Light Detection and Ranging (LIDAR) systems, one or more Radio Detection and Ranging (RADAR) systems, one or more cameras (e.g., visible spectrum cameras, infrared cameras, etc.), one or more motion sensors, one or more audio sensors (e.g., microphones, etc.), and/or other types of imaging capture devices and/or sensors. The sensor data can include image data (e.g., 2D camera data, video data, etc.), RADAR data, LIDAR data (e.g., 3D point cloud data, etc.), audio data, and/or other types of data. The one or more sensors can be located on various parts of the vehicle including a front side, rear side, left side, right side, top, and/or bottom of the vehicle. As described herein, the sensor(s) can be mounted to the exterior of the autonomous vehicle.

In some implementations, the sensor(s) can include one or more internal sensors. The internal sensor(s) can be configured to acquire sensor data associated with the interior of the autonomous vehicle. For example, the internal sensor(s) can include one or more cameras (e.g., cabin cameras), one or more infrared sensors, one or more motion sensors, one or more weight sensors (e.g., in a seat, in a trunk, etc.), and/or other types of sensors. The sensor data acquired via the internal sensor(s) can include, for example, image data indicative of a position of a passenger or item located within the interior (e.g., cabin, trunk, etc.) of the vehicle. This information can be provided to a remote computing system (e.g., of the service entity) and used, for example, to ensure the safety/comfort of the passenger, to prevent an item from being left by a passenger, confirm the cleanliness of the vehicle, remotely assist a passenger, confirm that special accommodations are available and met for a passenger (e.g., wheelchair is positioned correctly and secured), etc.

Example aspects of the present disclosure are directed to a mounting assembly for a cabin camera. The mounting assembly can include a camera housing for the cabin camera. In some implementations, the camera housing can include multiple components. For instance, the camera housing can include a backplate and a faceplate that are removably coupled to one another to provide an enclosure for the cabin camera. In this manner, the faceplate and backplate can be decoupled from one another to allow a user (e.g., technician) access to the cabin camera.

In some implementations, one or more fasteners can be attached to the backplate to retain the cabin camera against the faceplate. For instance, the one or more fasteners can include a spring clip attached to the backplate such that the spring clip exerts a force on the cabin camera to retain the cabin camera against the faceplate. In this manner, movement of the cabin camera relative to the faceplate can be restricted. In some implementations, the faceplate can include a lens bezel to accommodate a camera lens of the cabin camera. In such implementations, the one or more fasteners can restrict movement of the cabin camera relative to the faceplate to retain the camera lens within the lens bezel.

The mounting assembly can include a headliner mount that is removably couplable to the camera housing. The headliner mount can include a base defining an opening configured to accommodate the camera housing. The headliner mount can further include one or more retention members hingably coupled to the base. For instance, in some implementations, the headliner mount can include a first retention member hingably coupled to the base at a first location and a second retention member hingably coupled to the base at a second location that is different than the first location. In some implementations, the first retention member can be hingably coupled to the base at the first location via a first living hinge. Furthermore, the second retention member can be hingably coupled to the base at the second location via a second living hinge. As will be discussed below in more detail, the one or more retention members of the headliner mount move between a stowed position in which the one or more retention members do not contact the headliner and a deployed position in which the one or more retention members do contact the headliner to selectively secure the headliner mount to the headliner.

The headliner mount can be positioned relative to an opening (e.g., cutout) in the headliner of the autonomous vehicle such that the opening defined by the base of the headliner mount is aligned with the opening (e.g., cutout) in the headliner. In some implementations, the opening defined by the base of the headliner mount can be smaller than the opening defined by the headliner of the autonomous vehicle such that the headliner mount can be press-fitted to the headliner. The camera housing can be inserted through the aligned openings (e.g., opening in base of headliner mount and opening in headliner of autonomous vehicle) such that connectors (e.g., female connectors) of the camera housing engage corresponding connectors (e.g., male connectors) of the headliner mount. Furthermore, as the camera housing is inserted through the aligned openings to couple to the headliner mount, the camera housing can contact (e.g., touch) the retention members and cause the retention members to move from the stowed position to the deployed position to secure the headliner mount to the headliner.

When the retention members are in the deployed position, the one or more retention members can contact (e.g., touch) a backside of the headliner that is hidden from view of passengers riding in the autonomous vehicle. In this manner, the one or more retention members securing the headliner mount to the headliner can be hidden from view of the passengers riding in the autonomous vehicle. Furthermore, since the one or more retention members are hidden from the passengers, removal of the headliner mount and the camera housing coupled thereto by passengers riding in the autonomous vehicle can be prevented.

The headliner mount can accommodate variations in the thickness of the headliner based on a make and/or model of the autonomous vehicle. For instance, the one or more retention members can compress the headliner from a first thickness to a second thickness when the one or more retention members are in the deployed position. In this manner, the mounting assembly according to the present disclosure can allow the cabin camera to be mounted to the headliner of any make and/or model of vehicle.

The mounting assembly in accordance with the present disclosure can provide numerous technical effects and benefits. For instance, the one or more retention members of the headliner mount can, as discussed above, allow the headliner mount to accommodate variations in thickness of the headliners based on the make and/or model of the vehicle. In this manner, the headliner mount can allow the cabin camera to be mounted to the headliner of any vehicle. Furthermore, the living hinge of the headliner mount can accommodate several cycles (e.g., hundreds of thousands) of the one or more retention members moving between the stowed position and the deployed position. In this manner, the headliner mount can accommodate frequent removal of the camera housing therefrom to perform maintenance on the cabin camera. Still further, since the camera housing can be decoupled from the headliner mount using a standard automotive trim removal tool (e.g., pry), customized tools are not needed to facilitate removal of the camera housing from the headliner mount.

Referring now to the FIGS., FIG. 1 depicts a block diagram of an example system 100 for controlling and communicating with a vehicle according to example aspects of the present disclosure. As illustrated, FIG. 1 shows a system 100 that can include a vehicle 105 and a vehicle computing system 110 associated with the vehicle 105. The vehicle computing system 100 can be located onboard the vehicle 105 (e.g., it can be included on and/or within the vehicle 105).

The vehicle 105 incorporating the vehicle computing system 100 can be various types of vehicles. For instance, the vehicle 105 can be an autonomous vehicle. The vehicle 105 can be a ground-based autonomous vehicle (e.g., car, truck, bus, etc.). The vehicle 105 can be an air-based autonomous vehicle (e.g., airplane, helicopter, vertical takeoff and lift (VTOL) aircraft, etc.). The vehicle 105 can be a light weight elective vehicle (e.g., bicycle, scooter, etc.). The vehicle 105 can be another type of vehicles (e.g., watercraft, etc.). The vehicle 105 can drive, navigate, operate, etc. with minimal and/or no interaction from a human operator (e.g., driver, pilot, etc.). In some implementations, a human operator can be omitted from the vehicle 105 (and/or also omitted from remote control of the vehicle 105). In some implementations, a human operator can be included in the vehicle 105.

The vehicle 105 can be configured to operate in a plurality of operating modes. The vehicle 105 can be configured to operate in a fully autonomous (e.g., self-driving) operating mode in which the vehicle 105 is controllable without user input (e.g., can drive and navigate with no input from a human operator present in the vehicle 105 and/or remote from the vehicle 105). The vehicle 105 can operate in a semi-autonomous operating mode in which the vehicle 105 can operate with some input from a human operator present in the vehicle 105 (and/or a human operator that is remote from the vehicle 105). The vehicle 105 can enter into a manual operating mode in which the vehicle 105 is fully controllable by a human operator (e.g., human driver, pilot, etc.) and can be prohibited and/or disabled (e.g., temporary, permanently, etc.) from performing autonomous navigation (e.g., autonomous driving, flying, etc.). The vehicle 105 can be configured to operate in other modes such as, for example, park and/or sleep modes (e.g., for use between tasks/actions such as waiting to provide a vehicle service, recharging, etc.). In some implementations, the vehicle 105 can implement vehicle operating assistance technology (e.g., collision mitigation system, power assist steering, etc.), for example, to help assist the human operator of the vehicle 105 (e.g., while in a manual mode, etc.).

To help maintain and switch between operating modes, the vehicle computing system 110 can store data indicative of the operating modes of the vehicle 105 in a memory onboard the vehicle 105. For example, the operating modes can be defined by an operating mode data structure (e.g., rule, list, table, etc.) that indicates one or more operating parameters for the vehicle 105, while in the particular operating mode. For example, an operating mode data structure can indicate that the vehicle 105 is to autonomously plan its motion when in the fully autonomous operating mode. The vehicle computing system 110 can access the memory when implementing an operating mode.

The operating mode of the vehicle 105 can be adjusted in a variety of manners. For example, the operating mode of the vehicle 105 can be selected remotely, off-board the vehicle 105. For example, a remote computing system (e.g., of a vehicle provider and/or service entity associated with the vehicle 105) can communicate data to the vehicle 105 instructing the vehicle 105 to enter into, exit from, maintain, etc. an operating mode. By way of example, such data can instruct the vehicle 105 to enter into the fully autonomous operating mode.

In some implementations, the operating mode of the vehicle 105 can be set onboard and/or near the vehicle 105. For example, the vehicle computing system 110 can automatically determine when and where the vehicle 105 is to enter, change, maintain, etc. a particular operating mode (e.g., without user input). Additionally, or alternatively, the operating mode of the vehicle 105 can be manually selected via one or more interfaces located onboard the vehicle 105 (e.g., key switch, button, etc.) and/or associated with a computing device proximate to the vehicle 105 (e.g., a tablet operated by authorized personnel located near the vehicle 105). In some implementations, the operating mode of the vehicle 105 can be adjusted by manipulating a series of interfaces in a particular order to cause the vehicle 105 to enter into a particular operating mode.

The vehicle computing system 110 can include one or more computing devices located onboard the vehicle 105. For example, the computing device(s) can be located on and/or within the vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 105 (e.g., its computing system, one or more processors, etc.) to perform operations and functions, such as those described herein for controlling an autonomous vehicle, communicating with other computing systems, etc.

The vehicle 105 can include a communications system 115 configured to allow the vehicle computing system 110 (and its computing device(s)) to communicate with other computing devices. The communications system 115 can include any suitable components for interfacing with one or more network(s) 120, including, for example, transmitters, receivers, ports, controllers, antennas, and/or other suitable components that can help facilitate communication. In some implementations, the communications system 115 can include a plurality of components (e.g., antennas, transmitters, and/or receivers) that allow it to implement and utilize multiple-input, multiple-output (MIMO) technology and communication techniques.

The vehicle computing system 110 can use the communications system 115 to communicate with one or more computing device(s) that are remote from the vehicle 105 over one or more networks 120 (e.g., via one or more wireless signal connections). The network(s) 120 can exchange (send or receive) signals (e.g., electronic signals), data (e.g., data from a computing device), and/or other information and include any combination of various wired (e.g., twisted pair cable) and/or wireless communication mechanisms (e.g., cellular, wireless, satellite, microwave, and radio frequency) and/or any desired network topology (or topologies). For example, the network(s) 120 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communication network (or combination thereof) for transmitting data to and/or from the vehicle 105 and/or among computing systems.

In some implementations, the communications system 115 can also be configured to enable the vehicle 105 to communicate with and/or provide and/or receive data and/or signals from a remote computing device associated with a user 125 and/or an item (e.g., an item to be picked-up for a courier service). For example, the communications system 115 can allow the vehicle 105 to locate and/or exchange communications with a user device 130 of a user 125. In some implementations, the communications system 115 can allow communication among one or more of the system(s) on-board the vehicle 105.

As shown in FIG. 1, the vehicle 105 can include one or more sensors 135, an autonomy computing system 140, a vehicle interface 145, one or more vehicle control systems 150, and other systems, as described herein. One or more of these systems can be configured to communicate with one another via one or more communication channels. The communication channel(s) can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel(s).

The sensor(s) 135 can be configured to acquire sensor data 155. The sensor(s) 135 can be external sensors configured to acquire external sensor data. This can include sensor data associated with the surrounding environment of the vehicle 105. The surrounding environment of the vehicle 105 can include/be represented in the field of view of the sensor(s) 135. For instance, the sensor(s) 135 can acquire image and/or other data of the environment outside of the vehicle 105 and within a range and/or field of view of one or more of the sensor(s) 135. The sensor(s) 135 can include one or more Light Detection and Ranging (LIDAR) systems, one or more Radio Detection and Ranging (RADAR) systems, one or more cameras (e.g., visible spectrum cameras, infrared cameras, etc.), one or more motion sensors, one or more audio sensors (e.g., microphones, etc.), and/or other types of imaging capture devices and/or sensors. The one or more sensors can be located on various parts of the vehicle 105 including a front side, rear side, left side, right side, top, and/or bottom of the vehicle 105. The sensor data 155 can include image data (e.g., 2D camera data, video data, etc.), RADAR data, LIDAR data (e.g., 3D point cloud data, etc.), audio data, and/or other types of data. The vehicle 105 can also include other sensors configured to acquire data associated with the vehicle 105. For example, the vehicle 105 can include inertial measurement unit(s), wheel odometry devices, and/or other sensors.

In some implementations, the sensor(s) 135 can include one or more internal sensors. The internal sensor(s) can be configured to acquire sensor data 155 associated with the interior of the vehicle 105. For example, the internal sensor(s) can include one or more cameras, one or more infrared sensors, one or more motion sensors, one or more weight sensors (e.g., in a seat, in a trunk, etc.), and/or other types of sensors. The sensor data 155 acquired via the internal sensor(s) can include, for example, image data indicative of a position of a passenger or item located within the interior (e.g., cabin, trunk, etc.) of the vehicle 105. This information can be used, for example, to ensure the safety of the passenger, to prevent an item from being left by a passenger, confirm the cleanliness of the vehicle 105, remotely assist a passenger, etc.

In some implementations, the sensor data 155 can be indicative of one or more objects within the surrounding environment of the vehicle 105. The object(s) can include, for example, vehicles, pedestrians, bicycles, and/or other objects. The object(s) can be located in front of, to the rear of, to the side of, above, below the vehicle 105, etc. The sensor data 155 can be indicative of locations associated with the object(s) within the surrounding environment of the vehicle 105 at one or more times. The object(s) can be static objects (e.g., not in motion) and/or dynamic objects/actors (e.g., in motion or likely to be in motion) in the vehicle's environment. The sensor(s) 135 can provide the sensor data 155 to the autonomy computing system 140.

In addition to the sensor data 155, the autonomy computing system 140 can obtain map data 160. The map data 160 can provide detailed information about the surrounding environment of the vehicle 105 and/or the geographic area in which the vehicle was, is, and/or will be located. For example, the map data 160 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, and/or other traffic control devices); obstruction information (e.g., temporary or permanent blockages, etc.); event data (e.g., road closures/traffic rule alterations due to parades, concerts, sporting events, etc.); nominal vehicle path data (e.g., indicate of an ideal vehicle path such as along the center of a certain lane, etc.); and/or any other map data that provides information that assists the vehicle computing system 110 in processing, analyzing, and perceiving its surrounding environment and its relationship thereto. In some implementations, the map data 160 can include high definition map data. In some implementations, the map data 160 can include sparse map data indicative of a limited number of environmental features (e.g., lane boundaries, etc.). In some implementations, the map data can be limited to geographic area(s) and/or operating domains in which the vehicle 105 (or autonomous vehicles generally) may travel (e.g., due to legal/regulatory constraints, autonomy capabilities, and/or other factors).

The vehicle 105 can include a positioning system 165. The positioning system 165 can determine a current position of the vehicle 105. This can help the vehicle 105 localize itself within its environment. The positioning system 165 can be any device or circuitry for analyzing the position of the vehicle 105. For example, the positioning system 165 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 105 can be used by various systems of the vehicle computing system 110 and/or provided to a remote computing system. For example, the map data 160 can provide the vehicle 105 relative positions of the elements of a surrounding environment of the vehicle 105. The vehicle 105 can identify its position within the surrounding environment (e.g., across six axes, etc.) based at least in part on the map data 160. For example, the vehicle computing system 110 can process the sensor data 155 (e.g., LIDAR data, camera data, etc.) to match it to a map of the surrounding environment to get an understanding of the vehicle's position within that environment. Data indicative of the vehicle's position can be stored, communicated to, and/or otherwise obtained by the autonomy computing system 140.

The autonomy computing system 140 can perform various functions for autonomously operating the vehicle 105. For example, the autonomy computing system 140 can perform the following functions: perception 170A, prediction 170B, and motion planning 170C. For example, the autonomy computing system 140 can obtain the sensor data 155 via the sensor(s) 135, process the sensor data 155 (and/or other data) to perceive its surrounding environment, predict the motion of objects within the surrounding environment, and generate an appropriate motion plan through such surrounding environment. In some implementations, these autonomy functions can be performed by one or more sub-systems such as, for example, a perception system, a prediction system, a motion planning system, and/or other systems that cooperate to perceive the surrounding environment of the vehicle 105 and determine a motion plan for controlling the motion of the vehicle 105 accordingly. In some implementations, one or more of the perception, prediction, and/or motion planning functions 170A, 170B, 170C can be performed by (and/or combined into) the same system and/or via shared computing resources. In some implementations, one or more of these functions can be performed via difference sub-systems. As further described herein, the autonomy computing system 140 can communicate with the one or more vehicle control systems 150 to operate the vehicle 105 according to the motion plan (e.g., via the vehicle interface 145, etc.).

The vehicle computing system 110 (e.g., the autonomy computing system 140) can identify one or more objects that within the surrounding environment of the vehicle 105 based at least in part on the sensor data 135 and/or the map data 160. The objects perceived within the surrounding environment can be those within the field of view of the sensor(s) 135 and/or predicted to be occluded from the sensor(s) 135. This can include object(s) not in motion or not predicted to move (static objects) and/or object(s) in motion or predicted to be in motion (dynamic objects/actors). The vehicle computing system 110 (e.g., performing the perception function 170C, using a perception system, etc.) can process the sensor data 155, the map data 160, etc. to obtain perception data 175A. The vehicle computing system 110 can generate perception data 175A that is indicative of one or more states (e.g., current and/or past state(s)) of one or more objects that are within a surrounding environment of the vehicle 105. For example, the perception data 175A for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape, object highlighting, etc.); class (e.g., pedestrian class vs. vehicle class vs. bicycle class, etc.), the uncertainties associated therewith, and/or other state information. The vehicle computing system 110 can utilize one or more algorithms and/or machine-learned model(s) that are configured to identify object(s) based at least in part on the sensor data 155. This can include, for example, one or more neural networks trained to identify object(s) within the surrounding environment of the vehicle 105 and the state data associated therewith. The perception data 175A can be utilized for the prediction function 175B of the autonomy computing system 140.

The vehicle computing system 110 can be configured to predict a motion of the object(s) within the surrounding environment of the vehicle 105. For instance, the vehicle computing system 110 can generate prediction data 175B associated with such object(s). The prediction data 175B can be indicative of one or more predicted future locations of each respective object. For example, the prediction system 175B can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175B can be indicative of the speed and/or acceleration at which the respective object is predicted to travel along its associated predicted motion trajectory. The vehicle computing system 110 can utilize one or more algorithms and/or machine-learned model(s) that are configured to predict the future motion of object(s) based at least in part on the sensor data 155, the perception data 175A, map data 160, and/or other data. This can include, for example, one or more neural networks trained to predict the motion of the object(s) within the surrounding environment of the vehicle 105 based at least in part on the past and/or current state(s) of those objects as well as the environment in which the objects are located (e.g., the lane boundary in which it is travelling, etc.). The prediction data 175B can be utilized for the motion planning function 170C of the autonomy computing system 140.

The vehicle computing system 110 can determine a motion plan for the vehicle 105 based at least in part on the perception data 175A, the prediction data 175B, and/or other data. For example, the vehicle computing system 110 can generate motion planning data 175C indicative of a motion plan. The motion plan can include vehicle actions (e.g., speed(s), acceleration(s), other actions, etc.) with respect to one or more of the objects within the surrounding environment of the vehicle 105 as well as the objects' predicted movements. The motion plan can include one or more vehicle motion trajectories that indicate a path for the vehicle 105 to follow. A vehicle motion trajectory can be of a certain length and/or time range. A vehicle motion trajectory can be defined by one or more way points (with associated coordinates). The planned vehicle motion trajectories can indicate the path the vehicle 105 is to follow as it traverses a route from one location to another. Thus, the vehicle computing system 110 can take into account a route/route data when performing the motion planning function 170C.

The motion planning system 180 can implement an optimization algorithm, machine-learned model, etc. that considers cost data associated with a vehicle action as well as other objective functions (e.g., cost functions based on speed limits, traffic lights, etc.), if any, to determine optimized variables that make up the motion plan. The vehicle computing system 110 can determine that the vehicle 105 can perform a certain action (e.g., pass an object, etc.) without increasing the potential risk to the vehicle 105 and/or violating any traffic laws (e.g., speed limits, lane boundaries, signage, etc.). For instance, the vehicle computing system 110 can evaluate the predicted motion trajectories of one or more objects during its cost data analysis to help determine an optimized vehicle trajectory through the surrounding environment. The motion planning system 180 can generate cost data associated with such trajectories. In some implementations, one or more of the predicted motion trajectories and/or perceived objects may not ultimately change the motion of the vehicle 105 (e.g., due to an overriding factor). In some implementations, the motion plan may define the vehicle's motion such that the vehicle 105 avoids the object(s), reduces speed to give more leeway to one or more of the object(s), proceeds cautiously, performs a stopping action, passes an object, queues behind/in front of an object, etc.

The vehicle computing system 110 can be configured to continuously update the vehicle's motion plan and a corresponding planned vehicle motion trajectories. For example, in some implementations, the vehicle computing system 110 can generate new motion planning data 175C/motion plan(s) for the vehicle 105 (e.g., multiple times per second, etc.). Each new motion plan can describe a motion of the vehicle 105 over the next planning period (e.g., next several seconds, etc.). Moreover, a new motion plan may include a new planned vehicle motion trajectory. Thus, in some implementations, the vehicle computing system 110 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 105.

The vehicle computing system 110 can cause the vehicle 105 to initiate a motion control in accordance with at least a portion of the motion planning data 175C. A motion control can be an operation, action, etc. that is associated with controlling the motion of the vehicle 105. For instance, the motion planning data 175C can be provided to the vehicle control system(s) 150 of the vehicle 105. The vehicle control system(s) 150 can be associated with a vehicle interface 145 that is configured to implement a motion plan. The vehicle interface 145 can serve as an interface/conduit between the autonomy computing system 140 and the vehicle control systems 150 of the vehicle 105 and any electrical/mechanical controllers associated therewith. The vehicle interface 145 can, for example, translate a motion plan into instructions for the appropriate vehicle control component (e.g., acceleration control, brake control, steering control, etc.). By way of example, the vehicle interface 145 can translate a determined motion plan into instructions to adjust the steering of the vehicle 105 "X" degrees, apply a certain magnitude of braking force, increase/decrease speed, etc. The vehicle interface 145 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 105 to autonomously travel within the vehicle's surrounding environment.

The vehicle computing system 110 can store other types of data. For example, an indication, record, and/or other data indicative of the state of the vehicle (e.g., its location, motion trajectory, health information, etc.), the state of one or more users (e.g., passengers, operators, etc.) of the vehicle, and/or the state of an environment including one or more objects (e.g., the physical dimensions and/or appearance of the one or more objects, locations, predicted motion, etc.) can be stored locally in one or more memory devices of the vehicle 105. Additionally, the vehicle 105 can communicate data indicative of the state of the vehicle, the state of one or more passengers of the vehicle, and/or the state of an environment to a computing system that is remote from the vehicle 105, which can store such information in one or more memories remote from the vehicle 105. Moreover, the vehicle 105 can provide any of the data created and/or store onboard the vehicle 105 to another vehicle.

The vehicle computing system 110 can include the one or more vehicle user devices 180. For example, the vehicle computing system 110 can include one or more user devices with one or more display devices located onboard the vehicle 15. A display device (e.g., screen of a tablet, laptop, and/or smartphone) can be viewable by a user of the vehicle 105 that is located in the front of the vehicle 105 (e.g., driver's seat, front passenger seat). Additionally, or alternatively, a display device can be viewable by a user of the vehicle 105 that is located in the rear of the vehicle 105 (e.g., a back passenger seat). The user device(s) associated with the display devices can be any type of user device such as, for example, a table, mobile phone, laptop, etc. The vehicle user device(s) 180 can be configured to function as human-machine interfaces. For example, the vehicle user device(s) 180 can be configured to obtain user input, which can then be utilized by the vehicle computing system 110 and/or another computing system (e.g., a remote computing system, etc.). For example, a user (e.g., a passenger for transportation service, a vehicle operator, etc.) of the vehicle 105 can provide user input to adjust a destination location of the vehicle 105. The vehicle computing system 110 and/or another computing system can update the destination location of the vehicle 105 and the route associated therewith to reflect the change indicated by the user input.

The vehicle 105 can be configured to perform vehicle services for one or a plurality of different service entities 185. A vehicle 105 can perform a vehicle service by, for example and as further described herein, travelling (e.g., traveling autonomously) to a location associated with a requested vehicle service, allowing user(s) and/or item(s) to board or otherwise enter the vehicle 105, transporting the user(s) and/or item(s), allowing the user(s) and/or item(s) to deboard or otherwise exit the vehicle 105, etc. In this way, the vehicle 105 can provide the vehicle service(s) for a service entity to a user.

A service entity 185 can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of one or more vehicle services to one or more users. For example, a service entity can offer vehicle service(s) to users via one or more software applications (e.g., that are downloaded onto a user computing device), via a website, and/or via other types of interfaces that allow a user to request a vehicle service. As described herein, the vehicle services can include transportation services (e.g., by which a vehicle transports user(s) from one location to another), delivery services (e.g., by which a vehicle transports/delivers item(s) to a requested destination location), courier services (e.g., by which a vehicle retrieves item(s) from a requested origin location and transports/delivers the item to a requested destination location), and/or other types of services. The vehicle services can be wholly performed by the vehicle 105 (e.g., travelling from the user/item origin to the ultimate destination, etc.) or performed by one or more vehicles and/or modes of transportation (e.g., transferring the user/item at intermediate transfer points, etc.).

An operations computing system 190A of the service entity 185 can help to coordinate the performance of vehicle services by autonomous vehicles. The operations computing system 190A can include and/or implement one or more service platforms of the service entity. The operations computing system 190A can include one or more computing devices. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the operations computing system 190 (e.g., its one or more processors, etc.) to perform operations and functions, such as those described herein matching users and vehicles/vehicle fleets, deploying vehicles, facilitating the provision of vehicle services via autonomous vehicles, etc.

A user 125 can request a vehicle service from a service entity 185. For example, the user 125 can provide user input to a user device 130 to request a vehicle service (e.g., via a user interface associated with a mobile software application of the service entity 185 running on the user device 130). The user device 130 can communicate data indicative of a vehicle service request 195 to the operations computing system 190A associated with the service entity 185 (and/or another associated computing system that can then communicate data to the operations computing system 190A). The vehicle service request 195 can be associated with a user. The associated user can be the one that submits the vehicle service request (e.g., via an application on the user device 130). In some implementations, the user may not be the user that submits the vehicle service request. The vehicle service request can be indicative of the user. For example, the vehicle service request can include an identifier associated with the user and/or the user's profile/account with the service entity 185. The vehicle service request 195 can be generated in a manner that avoids the use of personally identifiable information and/or allows the user to control the types of information included in the vehicle service request 195. The vehicle service request 195 can also be generated, communicated, stored, etc. in a secure manner to protect information.

The vehicle service request 195 can indicate various types of information. For example, the vehicle service request 194 can indicate the type of vehicle service that is desired (e.g., a transportation service, a delivery service, a courier service, etc.), one or more locations (e.g., an origin location, a destination location, etc.), timing constraints (e.g., pick-up time, drop-off time, deadlines, etc.), and/or geographic constraints (e.g., to stay within a certain area, etc.). The service request 195 can indicate a type/size/class of vehicle such as, for example, a sedan, an SUV, luxury vehicle, standard vehicle, etc. The service request 195 can indicate a product of the service entity 185. For example, the service request 195 can indicate that the user is requesting a transportation pool product by which the user would potentially share the vehicle (and costs) with other users/items. In some implementations, the service request 195 can explicitly request for the vehicle service to be provided by an autonomous vehicle or a human-driven vehicle. In some implementations, the service request 195 can indicate a number of users that will be riding in the vehicle/utilizing the vehicle service. In some implementations, the service request 195 can indicate preferences/special accommodations of an associated user (e.g., music preferences, climate preferences, wheelchair accessibility, etc.) and/or other information.

The operations computing system 190A of the service entity 185 can process the data indicative of the vehicle service request 195 and generate a vehicle service assignment that is associated with the vehicle service request. The operations computing system can identify one or more vehicles that may be able to perform the requested vehicle services to the user 125. The operations computing system 190A can identify which modes of transportation are available to a user for the requested vehicle service (e.g., light electric vehicles, human-drive vehicles, autonomous vehicles, aerial vehicle, etc.) and/or the number of transportation modes/legs of a potential itinerary of the user for completing the vehicle service (e.g., single or plurality of modes, single or plurality of legs, etc.). For example, the operations computing system 190A can determined which autonomous vehicle(s) are online with the service entity 185 (e.g., available for a vehicle service assignment, addressing a vehicle service assignment, etc.) to help identify which autonomous vehicle(s) would be able to provide the vehicle service.

The operations computing system 190A and/or the vehicle computing system 110 can communicate with one or more other computing systems 190B that are remote from the vehicle 105. This can include, for example, computing systems associated with government functions (e.g., emergency services, regulatory bodies, etc.), computing systems associated with vehicle providers other than the service entity, computing systems of other vehicles (e.g., other autonomous vehicles, aerial vehicles, etc.). Communication with the other computing systems 190B can occur via the network(s) 120.

In some implementations, the vehicle control systems 150 can include a camera control system 152. For instance, the camera control system 152 can be configured to control operation of a cabin camera positioned within an interior of the vehicle 105 and configured to monitor activity occurring within the interior while the vehicle 105 is transporting one or more passengers from a pickup location to a drop-off location. For instance, the camera control system 152 can be configured to power on and power off the cabin camera. In some implementations, the camera control system 152 can be configured to control movement of the cabin camera to adjust a field of view thereof.

Figure 2:
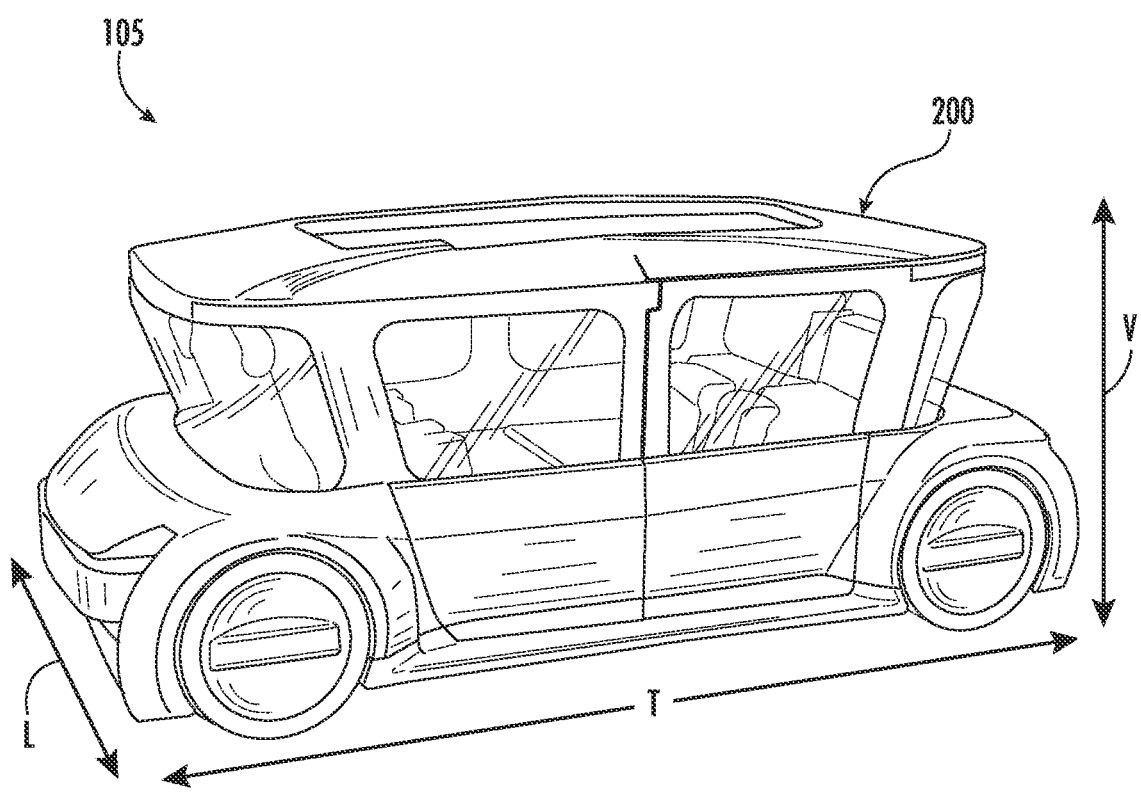
FIG. 2 depicts an autonomous vehicle according to example embodiments of the present disclosure.

Referring now to FIG. 2, an example embodiment of the vehicle 105 is provided. The vehicle 105 can define a lateral direction L, a transverse direction T, and a vertical direction V. As shown, the vehicle 105 can include a vehicle body 200. It should be understood that the vehicle body 200 can include a frame (not shown) of the vehicle 105. It should also be understood that the vehicle body 200 can, in some implementations, include one or more body panels coupled to the frame. The vehicle body 200 can define an interior configured to accommodate passengers of the vehicle 105.

Figure 3:
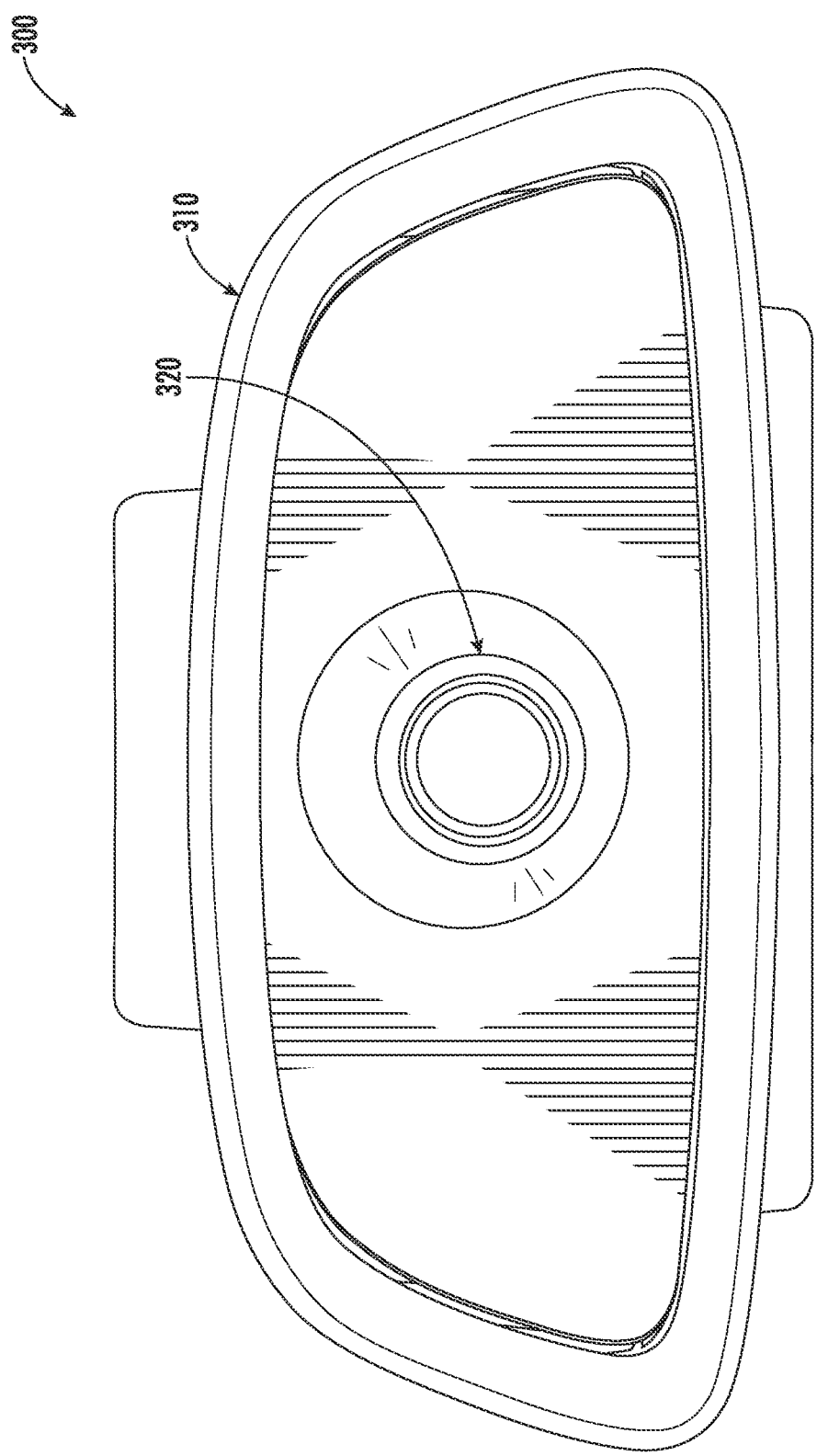
FIG. 3 depicts a cabin camera assembly according to example embodiments of the present disclosure.

Referring now to FIG. 3, a camera assembly 300 is provided according to example embodiments of the present disclosure. The camera assembly 300 can include a mounting assembly 310 and a camera 320 (e.g., cabin camera). The camera 320 can be coupled to a headliner of the vehicle 105 (FIG. 2) via the mounting assembly 310. For instance, the headliner can define an opening configured to accommodate the mounting assembly 310. In this manner, the mounting assembly 310 can be positioned within the opening defined by the headliner. Furthermore, the mounting assembly 310 can be configured to accommodate the camera 320 such that the camera 320 has a field of view of the interior (e.g., passenger compartment) of the vehicle 105 (FIG. 2). In this manner, the camera 320 can obtain video data indicative of activity within the interior of the vehicle 105 when the vehicle 105 is transporting one or more passengers.

Figure 4:
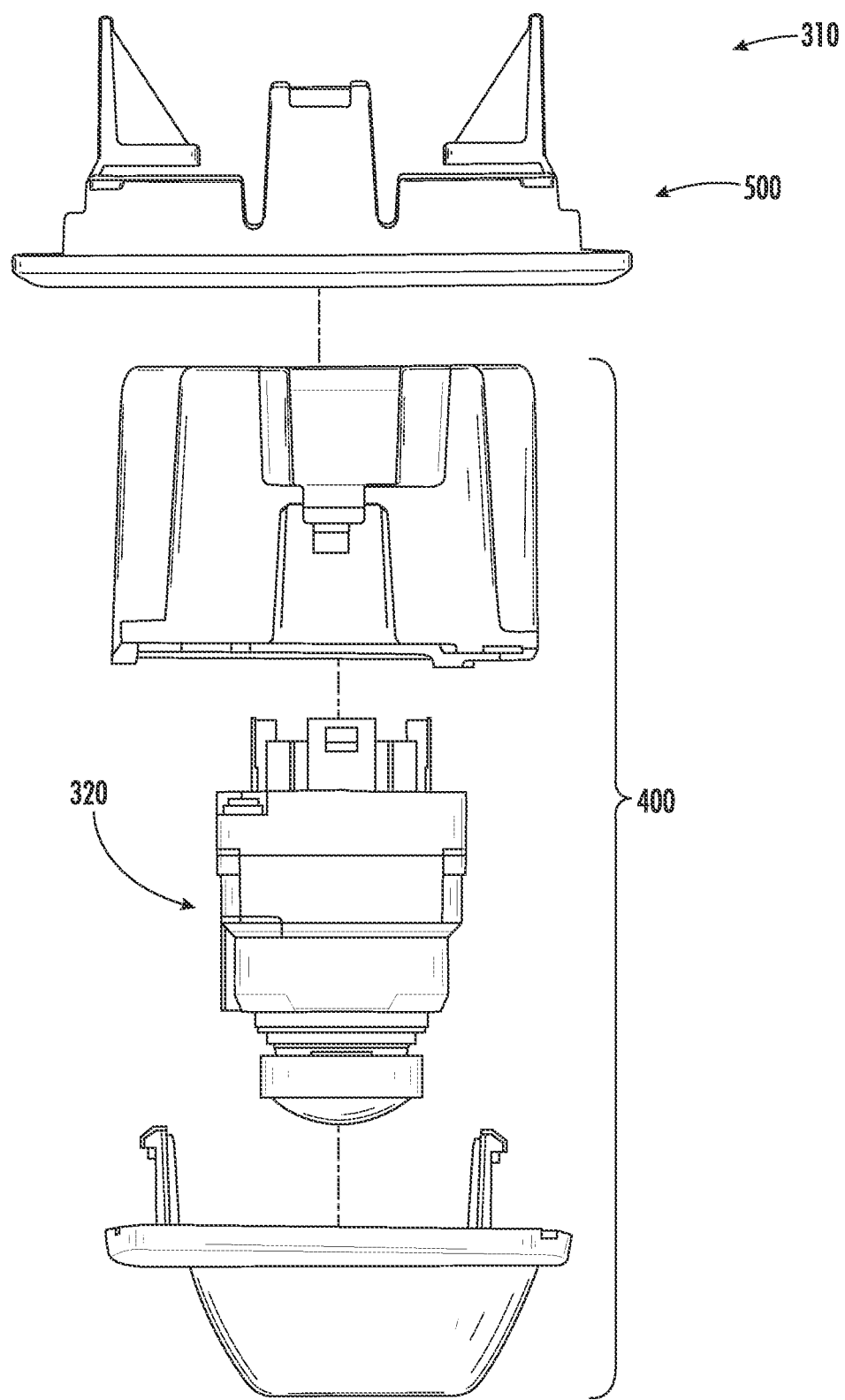
FIG. 4 depicts an exploded view of a mounting assembly for a cabin camera according to example embodiments of the present disclosure.

Referring now to FIG. 4, an exploded view of components of the mounting assembly 310 of the camera assembly 300 is provided according to example embodiments of the present disclosure. As shown, the mounting assembly 310 can include a camera housing 400 for the camera 320. The mounting assembly 310 can further include a headliner mount 500. The headliner mount 500 can be removably coupled to the camera housing 400. Furthermore, the headliner mount 500 can be secured to the headliner of the vehicle 105 (FIG. 2). For instance, the headliner mount 500 can be positioned within the opening defined by the headliner of the vehicle 105. In this manner, the camera 320 can be secured to the headliner of the vehicle 105 via the headliner mount 500. In some implementations, the camera housing 400 and the headliner mount 500 can each be formed from polyurethane (e.g., plastic). It should be appreciated, however, that the camera housing 400 and the headliner mount 500 can be formed using other suitable materials.

Figure 5:
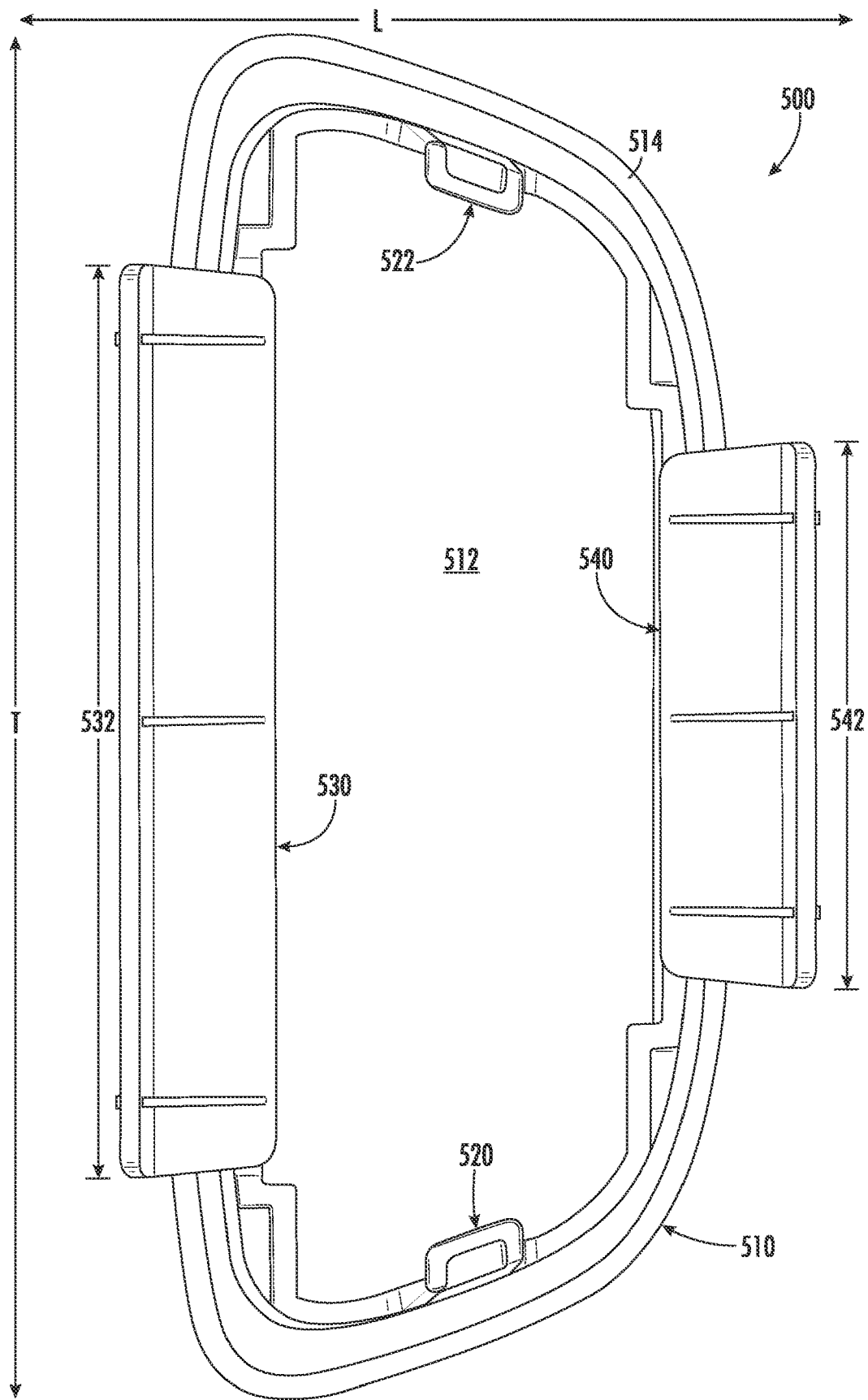
FIG. 5 depicts a top view of a headliner mount of a mounting assembly according to example embodiments of the present disclosure
Figure 6:
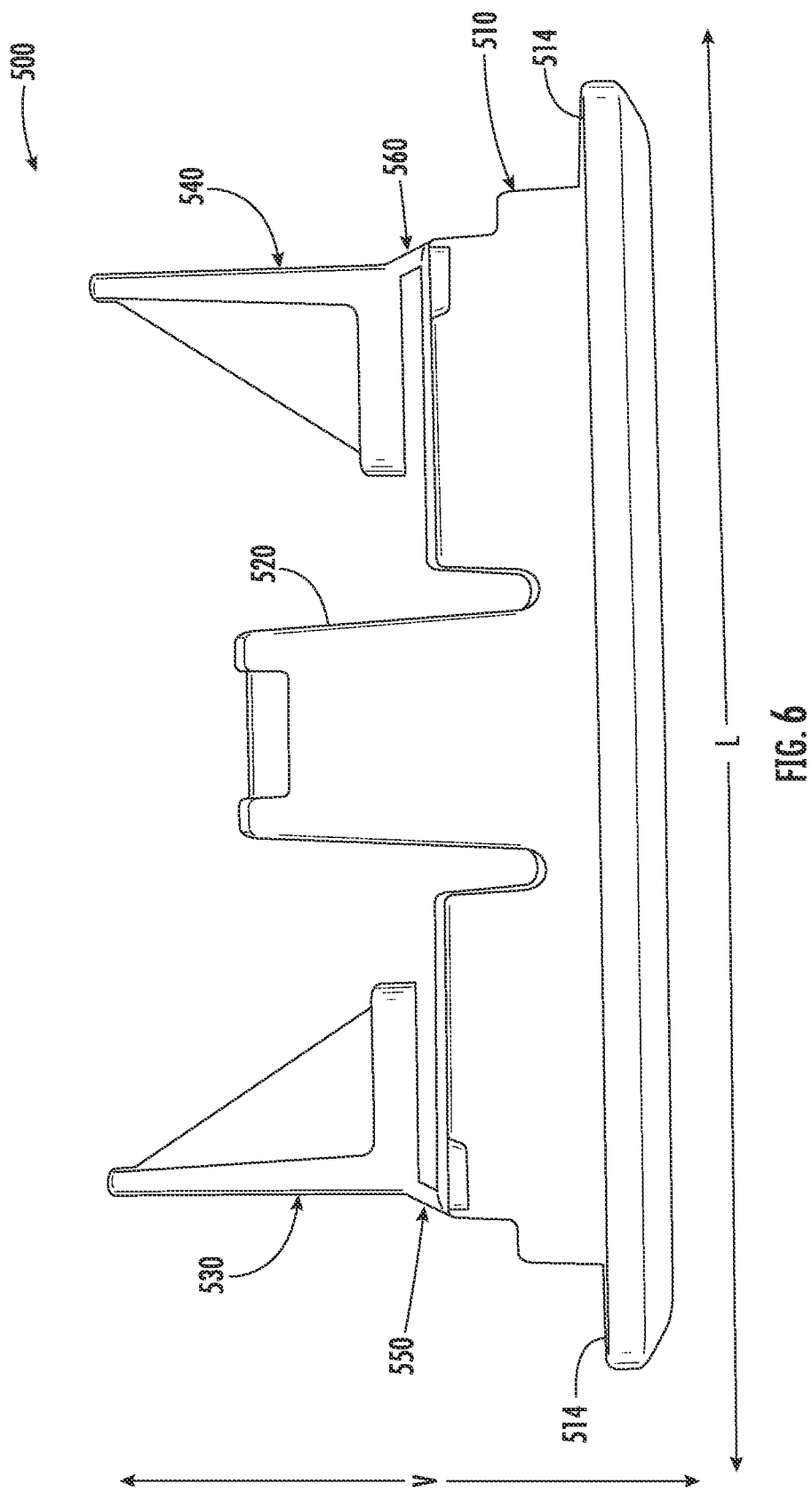
FIG. 6 depicts a side view of a headliner mount of a mounting assembly according to example embodiments of the present disclosure.

Referring now to FIGS. 5 and 6, a top view (FIG. 5) and a side view (FIG. 6) of the headliner mount 500 are provided according to example embodiments of the present disclosure. The headliner mount 500 can define a lateral direction L, a transverse direction T, and a vertical direction V. As shown, the headliner mount 500 can include a base 510. The base 510 can define an opening 512 configured to accommodate the camera housing 400 (FIG. 4). In some implementations, the opening 512 defined by the base 510 of the headliner mount 500 can be smaller than an opening defined by the headliner of the vehicle 105 such that the headliner mount can be press-fitted to the headliner. Furthermore, in some implementations, the base 510 can include a lip 514 that contacts the headliner to hide the opening defined by the headliner.

The headliner mount 500 can be couplable to camera housing 400. For instance, in some implementations, the headliner mount 500 can include a first connector 520 and a second connector 522. The first connector 520 and the second connector 522 can be spaced apart from one another along the transverse direction T. In this manner, the first connector 520 and the second connector 522 can couple to the camera housing 400 at different locations. For instance, the first connector 520 can couple to the camera housing 400 at a first location thereon. Conversely, the second connector 522 can couple to the camera housing 400 at a second location thereon. It should be understood that the second location on the camera housing 400 is different than the first location on the camera housing 400. In alternative implementation, the headliner mount 500 can include more or fewer than two connectors (e.g., first connector 520 and second connector 522). It should be appreciated that the connectors (e.g., first connector 520 and second connector 522) can include any suitable type of connector configured to facilitate coupling the headliner mount 500 to the camera housing 400. For instance, in some implementations, the first connector 520 and the second connector 522 can each include a snap connector.

The headliner mount 500 can include one or more retention members hingably coupled to the base 510. For instance, in some implementations, the headliner mount 500 can include a first retention member 530 and a second retention member 540. The first retention member 530 can be hingably coupled to the base 510 at a first location via a first living hinge 550. The second retention member 540 can be hingably coupled to the base 510 at a second location via a second living hinge 560. In some implementations, the second location can be spaced apart from the first location such that the first retention member 530 and the second retention member 540 are spaced apart from one another along the lateral direction L.

In some implementations, a length 532 of the first retention member 530 can be different than a length 542 of the second retention member 540. For instance, in some implementations, the first retention member 530 can be at least twice as long as the second retention member 540. In alternative implementation, the length 532 of the first retention member 530 and the length 542 of the second retention member can be substantially the same (e.g., within about 5 inches, within about 1 inch, etc.).

Figure 7:
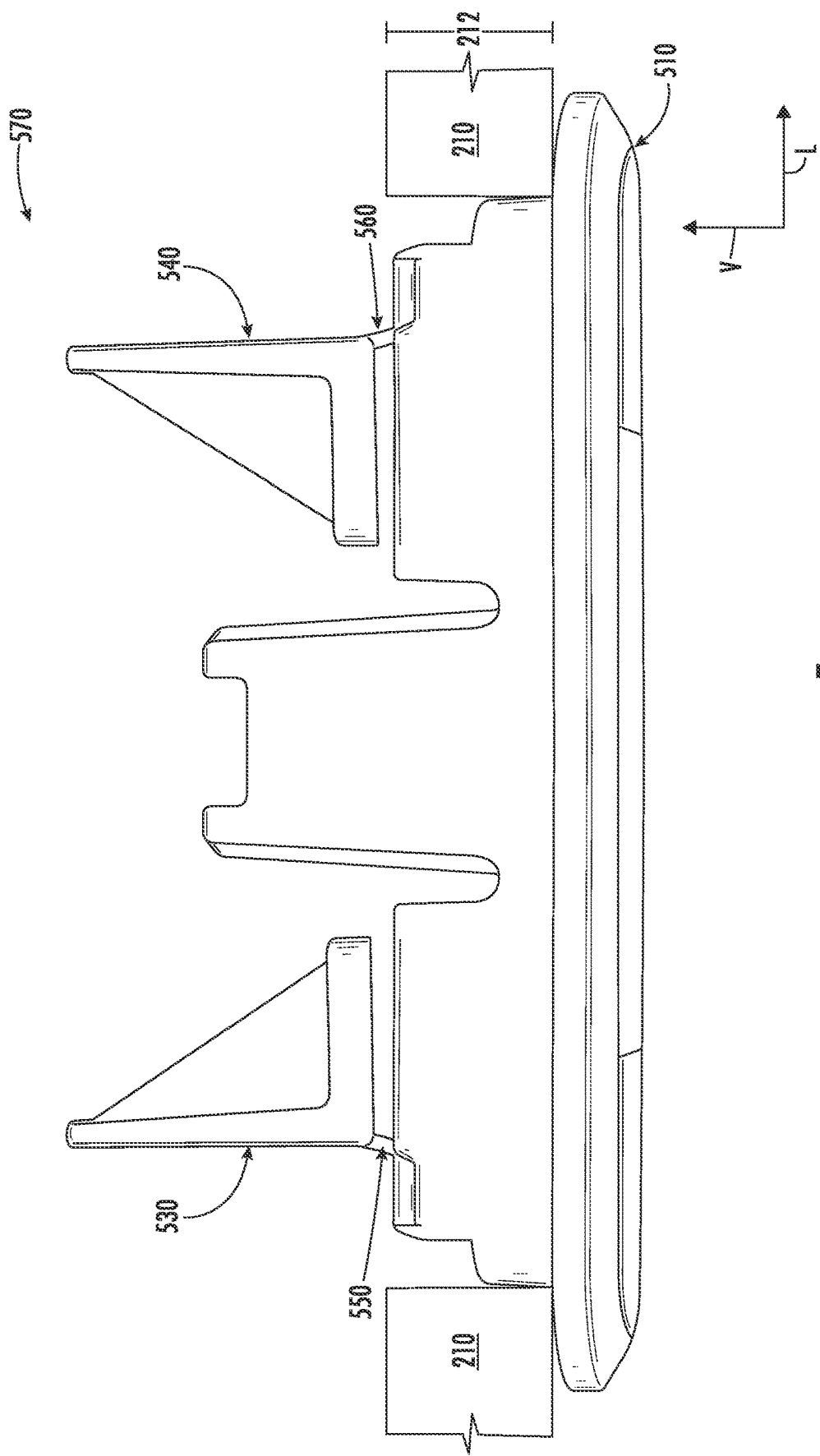
FIG. 7 depicts retention members of a headliner mount of a mounting assembly in a stowed positioned according to example embodiments of the present disclosure.
Figure 8:
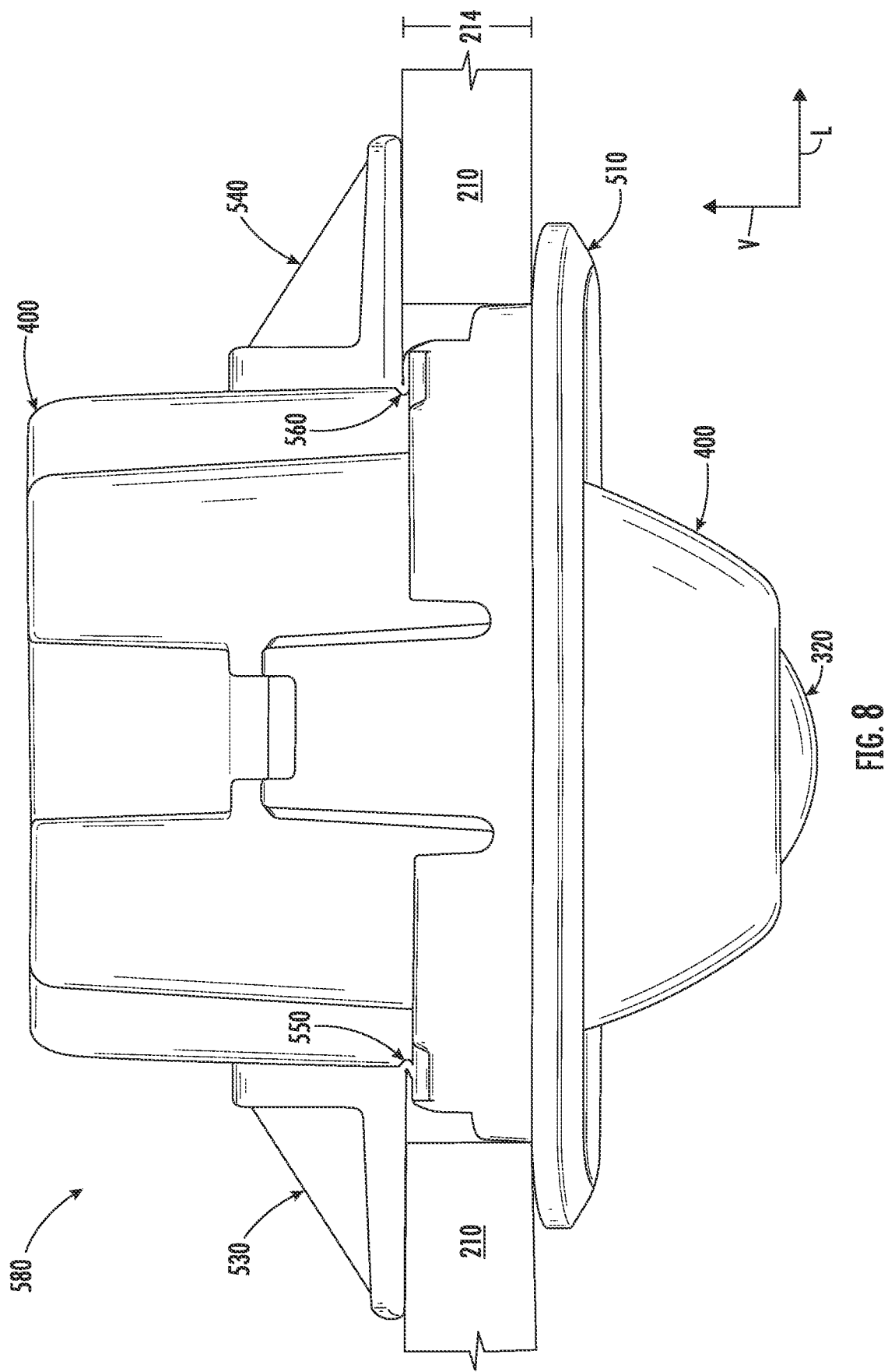
FIG. 8 depicts retention members of a headliner mount of a mounting assembly in a deployed positioned according to example embodiments of the present disclosure.

Referring now to FIGS. 7 and 8, the first retention member 530 and the second retention member 540 can each move between a stowed position 570 (FIG. 7) in which the first retention member 530 and the second retention member 540 do not contact a headliner 210 of the vehicle 105 (FIG. 2) and a deployed position 580 (FIG. 8) in which the first retention member 530 and the second retention member 540 do contact the headliner 210 of the vehicle 105. The camera housing 400 can cause the first retention member 530 and the second retention member 540 to move between the stowed position and the deployed position. For instance, as the camera housing 400 is inserted through the opening 512 (FIGS. 5 and 6) defined by the base 510 of the headliner mount 500 to couple thereto, the camera housing 400 can contact (e.g., touch) the retention members (e.g., first retention member 530 and second retention member 540) and cause the retention members to move from the stowed position to the deployed position to secure the headliner mount 500 to the headliner 210 of the vehicle 105 (FIG. 2). Furthermore, when the first retention member 530 and the second retention member 540 are in the deployed position (FIG. 8), the first retention member 530 and the second retention member 540 can compress the headliner 210 from a first thickness 212 to a second thickness 214. In this manner, the mounting assembly according to the present disclosure can allow the camera 320 (FIG. 4) to be mounted to the headliner 210 of any make and/or model of vehicle 105 (FIG. 2).

Figure 9:
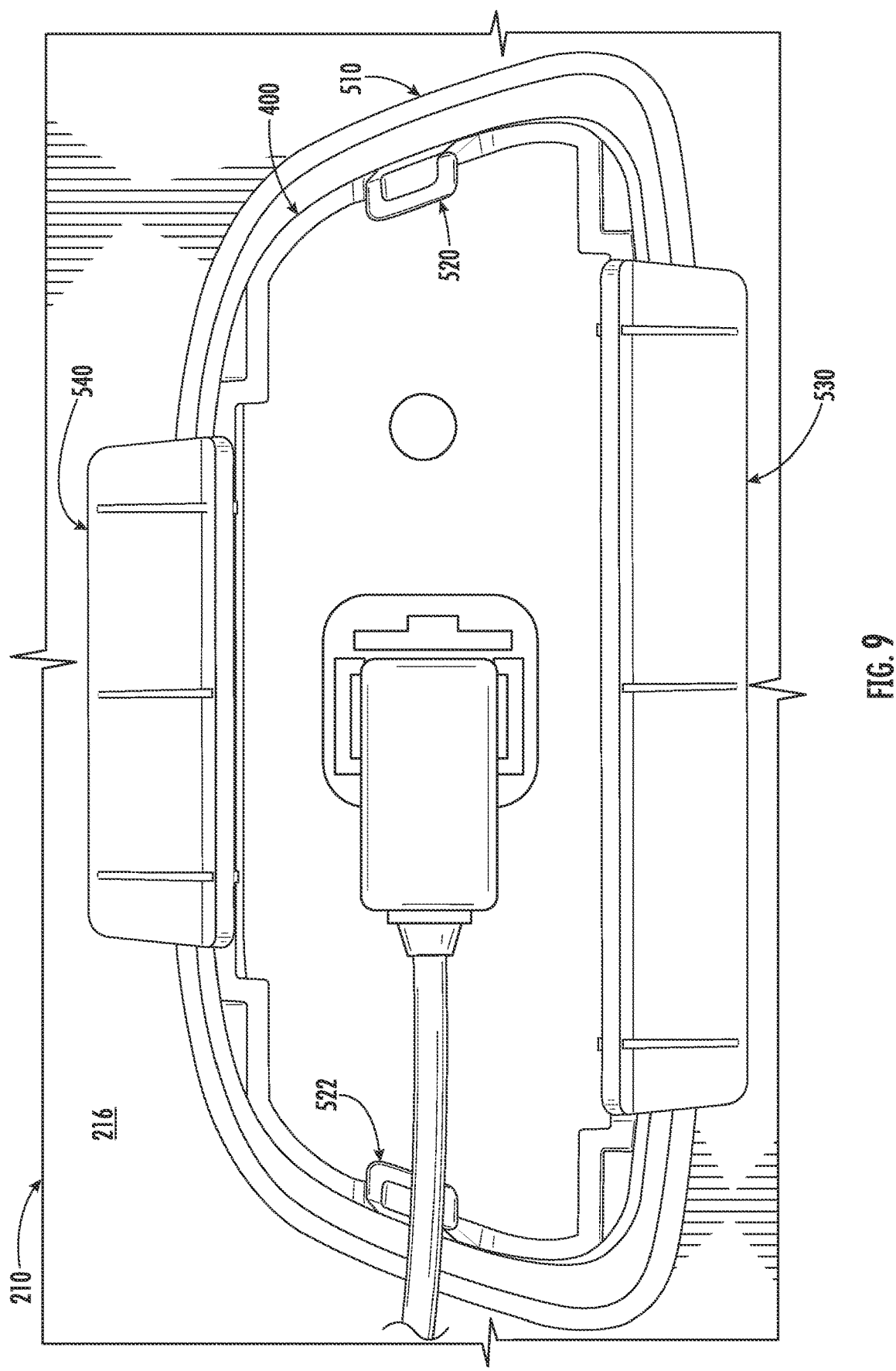
FIG. 9 depicts retention members of a headliner mount contacting a first surface of a headliner according to example embodiments of the present disclosure

Referring now to FIG. 9, the first retention member 530 and the second retention member 540 are each in the deployed position. As shown, the first retention member 530 and the second retention member 540 can each contact (e.g., touch) a first surface 216 of the headliner 210 that is hidden from view of passengers riding within the interior of the vehicle 105 (FIG. 2). In this manner, the first retention member 530 and the second retention member 540 can be hidden from view of the passengers riding in the vehicle 105. Furthermore, since the first retention member 530 and the second retention member 540 are hidden from the passengers, removal of the headliner mount 500 and the camera housing 400 (FIG. 4) coupled thereto by passengers riding in the vehicle 105 can be prevented.

Figure 10:
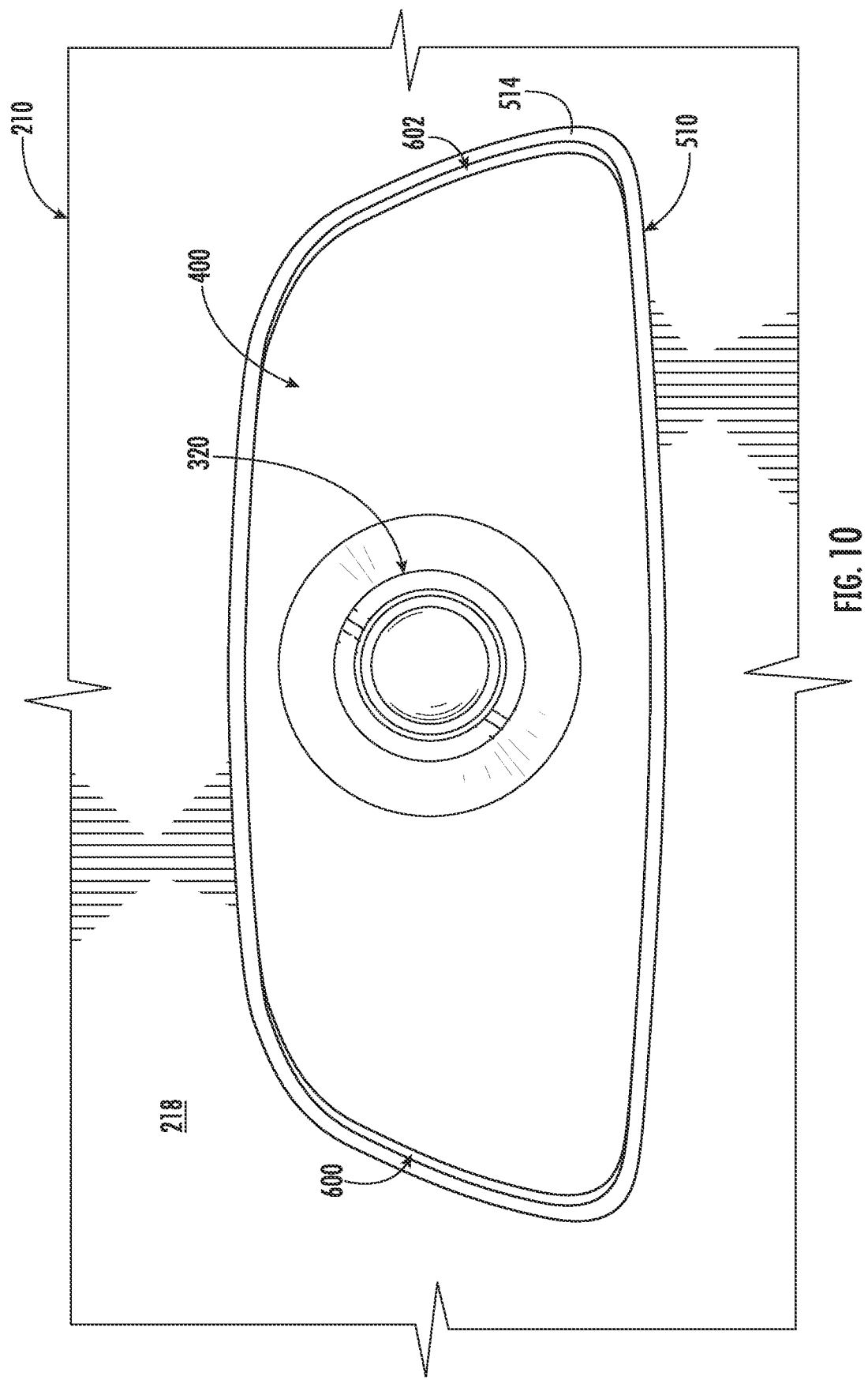
FIG. 10 depicts a base of a headliner mount contacting a second surface of a headliner according to example embodiments of the present disclosure.

Referring now to FIG. 10, the base 510 of the headliner mount 500 can, in some implementations, include a lip 514. When the headliner mount 500 is positioned within the opening defined by the headliner 210, the lip 514 can contact a second surface 218 of the headliner 210 that is visible to passengers riding within the interior of the vehicle 105 (FIG. 2). For instance, the lip 514 can contact the second surface 218 of the headliner 210 such that the lip 514 covers the periphery (e.g., outer edge) of the opening defined by the headliner 210. In this manner, the periphery of the opening defined by the headliner 210 can be hidden from the view of passengers riding within the interior of the vehicle 105 (FIG. 2).

In some implementations, one or more gaps can be defined between the camera housing 400 and the base 510 of headliner mount 500 to allow a user (e.g., technician) to access connectors (e.g., first connector 520 and second connector 522) of headliner mount 500 to decouple the headliner mount 500 from the camera housing 400. For instance, a first gap 600 can be defined between the camera housing 400 and the lip 514 of the base 510 to allow the user to access the first connector 520 of the headliner mount 500 to decouple the headliner mount 500 from the camera housing 400 at the first location thereon. Additionally, a second gap 602 can be defined between the camera housing 400 and the lip of the base 510 to allow the user to access the second connector 522 of the headliner mount 500 to decouple the headliner mount 500 from the camera housing 400 at the second location thereon. It should be understood that the gaps 600, 602 are sized to accommodate a standard automotive trim removal tool (e.g., pry).

Figure 11:
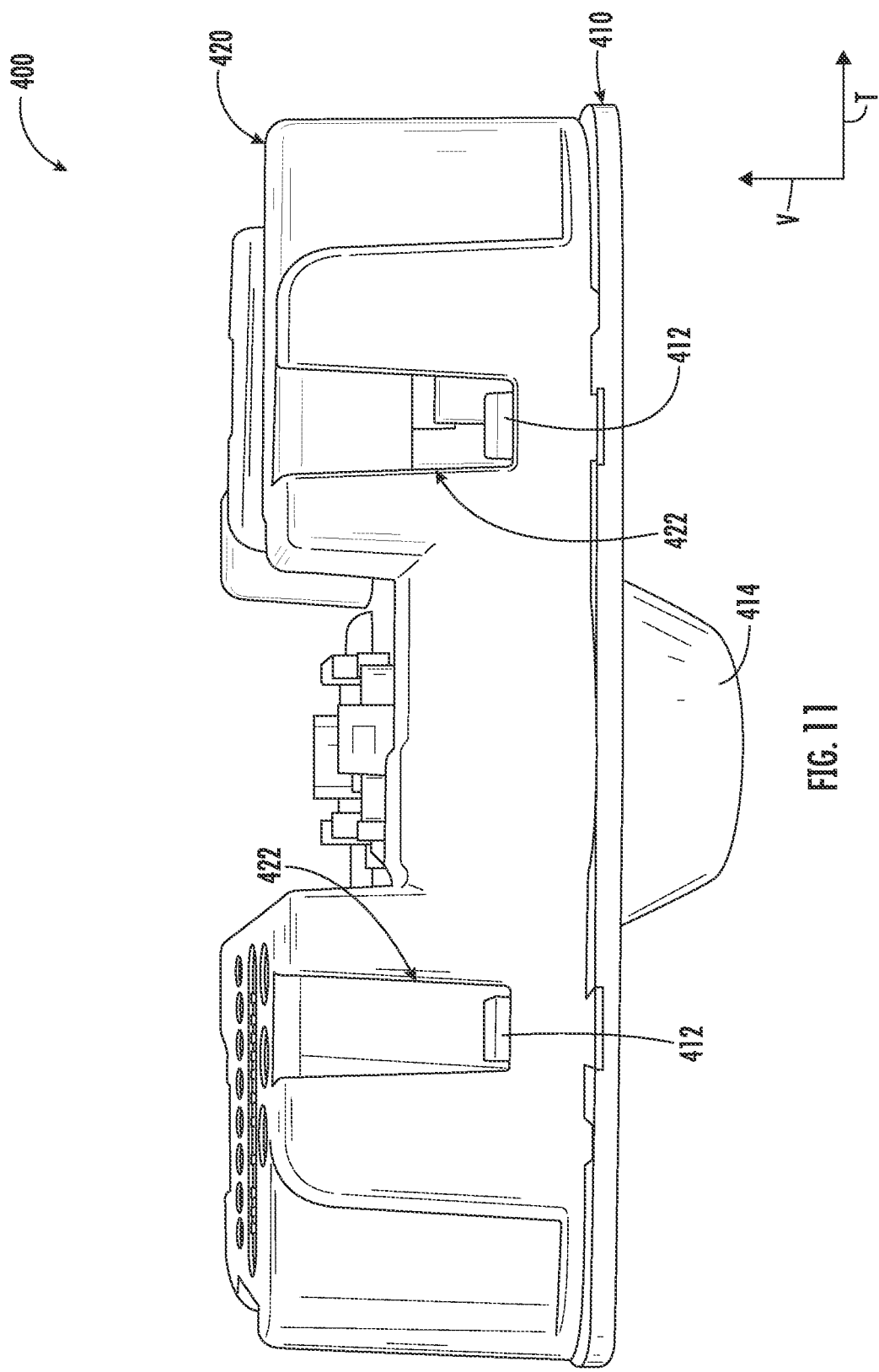
FIG. 11 depicts a camera housing according to example embodiments of the present disclosure.
Figure 12:
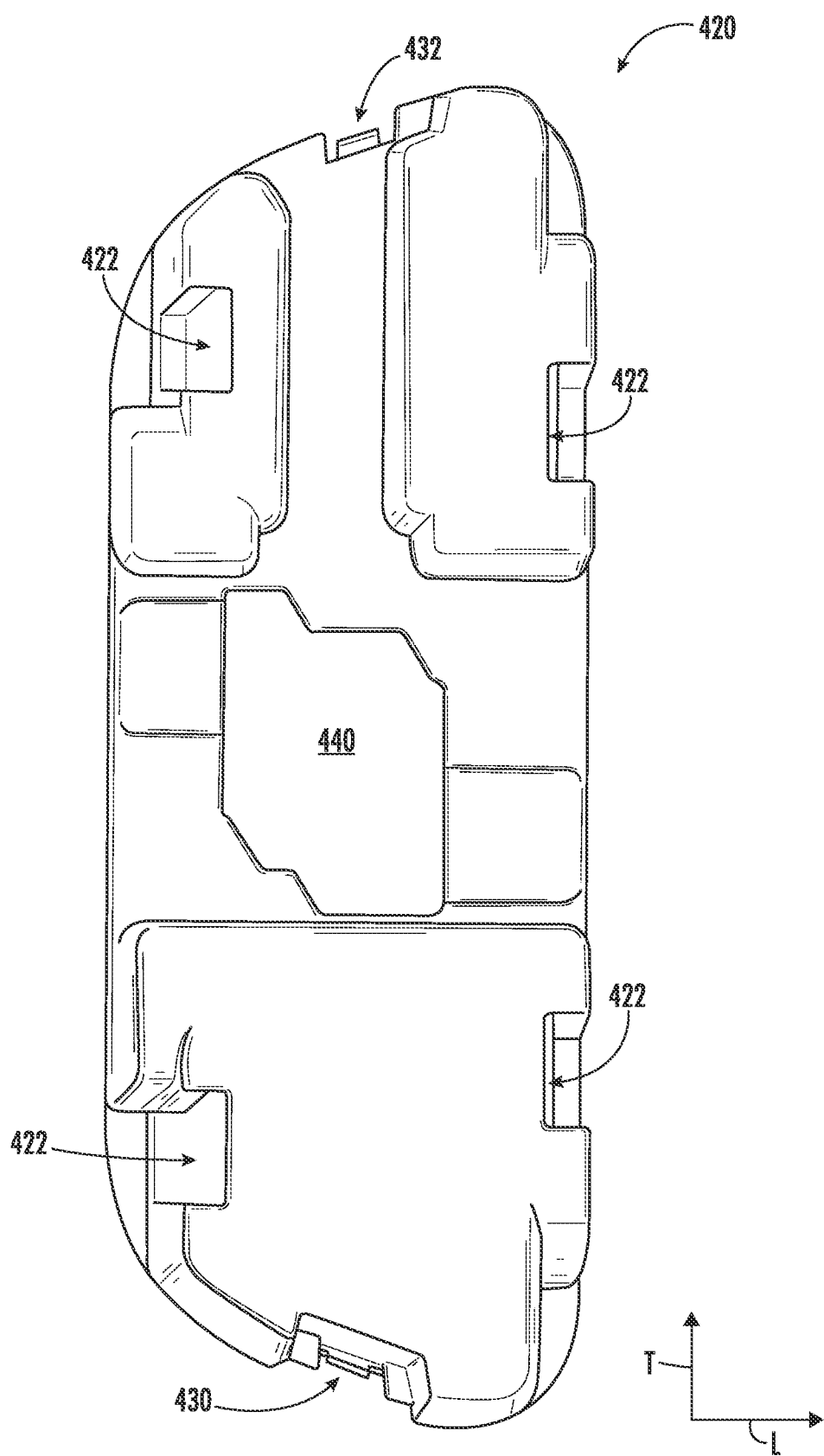
FIG. 12 depicts a top view of a backplate of the camera housing of FIG. 11 according to example embodiments of the present disclosure.

Referring now to FIGS. 11 and 12, an example embodiment of the camera housing 400 of the mounting assembly 310 (FIG. 4) is provided according to the present disclosure. The camera housing 400 can defined a lateral direction L, a transverse direction T, and a vertical direction V. As shown, the camera housing 400 can include a faceplate 410 and a backplate 420. The faceplate 410 and the backplate 420 can be removably coupled to one another to provide an enclosure for the camera 320 (FIG. 4). In this manner, the faceplate 410 and the backplate 420 can be decoupled from one another to allow a user (e.g., technician) access to the camera 320.

In some implementations, the faceplate 410 can include a plurality of connectors 412 to facilitate coupling the faceplate 410 to the backplate 420. Each of the connectors 412 can be disposed at a different location on the faceplate 410. Furthermore, the backplate 420 can define a plurality of slots 422. Each of the plurality of slots 422 can be configured to receive a corresponding connector of the faceplate 410. In this manner, each of the plurality of connectors 412 can be received within a corresponding slot of the plurality of slots 422 when the faceplate 410 and the backplate 420 are coupled to one another.

In some implementations, the backplate 420 can define a channel to accommodate the connectors of the headliner mount 500 (FIG. 4). For instance, the backplate 420 can define a first channel 430 to accommodate the first connector 520 (FIG. 5) of the headliner mount 500. Additionally, the backplate 420 can define a second channel 432 to accommodate the second connector 522 (FIG. 5) of the headliner mount 500. When the headliner mount 500 is coupled to the backplate 420 of the camera housing 400, the first connector 520 of the headliner mount 500 and the second connector 522 of the headliner mount 500 can be positioned within the first channel 430 of the backplate 420 and the second channel 432 of the backplate 420, respectively.

In some implementations, the backplate 420 of the camera housing 400 can define an opening 440 to accommodate a wire harness associated with the camera 320 (FIG. 3). Alternatively, or additionally, one or more fasteners (not shown) can be attached to the backplate 420 to retain the camera 320 against the faceplate 410. For instance, the one or more fasteners can include a spring clip attached to the backplate 420 such that the spring clip exerts a force on the camera 320 to retain the camera 320 against the faceplate 410. In this manner, movement of the camera 320 relative to the faceplate 410 can be restricted. In some implementations, the faceplate 410 can include a lens bezel 414 to accommodate a portion (e.g., camera lens) of the camera 320. In such implementations, the one or more fasteners can restrict movement of the camera 320 relative to the faceplate 410 to retain the portion of the camera 320 within the lens bezel 414. It should be understood that one or more other types of fasteners can be utilized.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A mounting assembly comprising:
   a camera housing for a camera; and
   a headliner mount removably couplable to the camera housing, the headliner mount comprising:
      a base defining an opening to accommodate the camera housing; and
      one or more retention members hingably coupled to the base, the one or more retention members movable between a deployed position and a stowed position to selectively secure the headliner mount to a headliner of a vehicle,
      wherein in the deployed position, the camera housing directly contacts at least one of the one or more retention members.

2. The mounting assembly of claim 1, wherein the one or more retention members comprise:
   a first retention member hingably coupled to the base at a first location; and
   a second retention member hingably coupled to the base at a second location, the second location being different than the first location.

3. The mounting assembly of claim 2, wherein:
   the first retention member is hingably coupled to the base at the first location by a first living hinge; and
   the second retention member is hingably coupled to the base at the second location by a second living hinge.

4. The mounting assembly of claim 1, wherein in the deployed position, the one or more retention members contact a first surface of the headliner.

5. The mounting assembly of claim 4, wherein in the deployed position, the base contacts a second surface of the headliner, the second surface being opposite the first surface.

6. The mounting assembly of claim 4, wherein in the deployed position, the one or more retention members compress a thickness of the headliner from a first thickness to a second thickness.

7. The mounting assembly of claim 1, wherein in the stowed position, the headliner mount is decoupled from the camera housing.

8. The mounting assembly of claim 1, wherein in the deployed position, when the headliner mount is coupled to the camera housing.

9. The mounting assembly of claim 1, wherein the camera housing comprises a backplate and a faceplate, the faceplate removably coupled to the backplate.

10. The mounting assembly of claim 9, wherein the faceplate defines an opening to accommodate a lens of a camera disposed within the camera housing.

11. The mounting assembly of claim 9, wherein the base further comprises a first connector and a second connector, the first connector configured to couple the headliner mount to the backplate at a first location, the second connector configured to couple the headliner mount to the backplate at a second location, the second location being different than the first location.

12. An autonomous vehicle comprising:
    a vehicle body defining an interior;
    a camera positioned within the interior of the vehicle body; and
    a mounting assembly comprising:
       a camera housing for the camera; and
       a headliner mount removably couplable to the camera housing, the headliner mount comprising:
          a base defining an opening to accommodate the camera housing; and
          one or more retention members hingably coupled to the base, the one or more retention members movable between a deployed position and a stowed position to selectively secure the headliner mount to a headliner of the autonomous vehicle,
          wherein in the deployed position, the camera housing directly contacts at least one of the one or more retention members.

13. The autonomous vehicle of claim 12, wherein in the stowed position, the headliner mount is decoupled from the camera housing.

14. The autonomous vehicle of claim 12, wherein in the deployed position, the headliner mount is coupled to the camera housing.

15. The autonomous vehicle of claim 12, wherein the one or more retention members are spaced apart from a lip of the base along a vertical direction.

16. The autonomous vehicle of claim 15, wherein in the deployed position, the lip of the base contacts the headliner.

17. The autonomous vehicle of claim 12, wherein the camera housing comprises a backplate and a faceplate, the faceplate removably coupled to the backplate.

18. The autonomous vehicle of claim 17, wherein the camera is secured against the faceplate by one or more fasteners removably coupled to the backplate.

19. The autonomous vehicle of claim 12, wherein a field-of-view of the camera is about 360 degrees.

20. A camera assembly comprising:
   a camera having one or more lenses; and
   a mounting assembly comprising:
      a camera housing for the camera; and
      a headliner mount removably couplable to the camera housing, the headliner mount comprising:
         a base defining an opening to accommodate the camera housing; and
         one or more retention members hingably coupled to the base, the one or more retention members movable between a deployed position and a stowed position to selectively secure the headliner mount to a headliner of a vehicle,
      wherein in the deployed position, the camera housing directly contacts at least one of the one or more retention members.

\* \* \* \* \*